United States Patent
Naganuma et al.

(10) Patent No.: US 9,366,909 B2
(45) Date of Patent: Jun. 14, 2016

(54) IMAGE DISPLAY DEVICE AND LIQUID CRYSTAL LENS

(71) Applicant: Japan Display Inc., Tokyo (JP)

(72) Inventors: Tomohiko Naganuma, Tokyo (JP); Shinichiro Oka, Tokyo (JP)

(73) Assignee: Japan Display Inc., Tokyo (JP)

( * ) Notice: Subject to any disclaimer, the term of this patent is extended or adjusted under 35 U.S.C. 154(b) by 212 days.

(21) Appl. No.: 14/069,409

(22) Filed: Nov. 1, 2013

(65) Prior Publication Data

US 2014/0125934 A1    May 8, 2014

(30) Foreign Application Priority Data

Nov. 7, 2012 (JP) ................................. 2012-245848

(51) Int. Cl.
*G02F 1/13* (2006.01)
*G02F 1/1337* (2006.01)
*G02B 27/22* (2006.01)
*H04N 13/04* (2006.01)
*G02F 1/1343* (2006.01)
*G02F 1/29* (2006.01)

(52) U.S. Cl.
CPC ...... *G02F 1/133784* (2013.01); *G02B 27/2214* (2013.01); *H04N 13/0404* (2013.01); *H04N 13/0454* (2013.01); *G02F 1/134336* (2013.01); *G02F 1/29* (2013.01); *G02F 2001/133738* (2013.01)

(58) Field of Classification Search
None
See application file for complete search history.

(56) References Cited

U.S. PATENT DOCUMENTS 6,816,207 B2    11/2004    Jung

FOREIGN PATENT DOCUMENTS

| CN | 101166287 A | 4/2008 |
|---|---|---|
| JP | 2001-109020 | 4/2001 |
| JP | 2011-164273 | 8/2011 |
| KR | 20110118853 A | 11/2011 |
| KR | 10-2012-0026106 A | 3/2012 |
| KR | 2012-0058403 | 6/2012 |
| TW | 200937368 A | 9/2009 |
| WO | 2012053457 A1 | 4/2012 |

OTHER PUBLICATIONS

Office Action in corresponding Korean Patent Application No. 10-2013-133364, dated Aug. 30, 2014, and English translation thereof.
Office Action dated Sep. 23, 2015 for a corresponding Taiwan Patent Application 102140206.
Office Action dated May 26, 2015 regarding a counterpart Korean patent application No. 10-2013-133364.
Office Action in corresponding Korean Patent Application No. 10-2013-133364, dated Aug. 30, 2013, and English translation thereof.

*Primary Examiner* — Richard Kim
(74) *Attorney, Agent, or Firm* — Typha IP LLC

(57) ABSTRACT

An image display device includes a liquid crystal lens on a display surface side of a display panel. The liquid crystal lens includes a first substrate, a second substrate, a liquid crystal layer interposed between the first substrate and the second substrate, a first alignment film and a second alignment film formed on an interface of the liquid crystal layer. The first alignment film and the second alignment film are alignment films subjected to a rubbing treatment so that liquid crystal molecules in the liquid crystal layer are aligned in a 90° twist in a first direction by the provision of a pretilt angle. The liquid crystal molecules are aligned, by the addition of a chiral agent to the liquid crystal layer, in a 90° twist in a second direction opposite to the first direction in a state where an electric field is not applied.

4 Claims, 10 Drawing Sheets

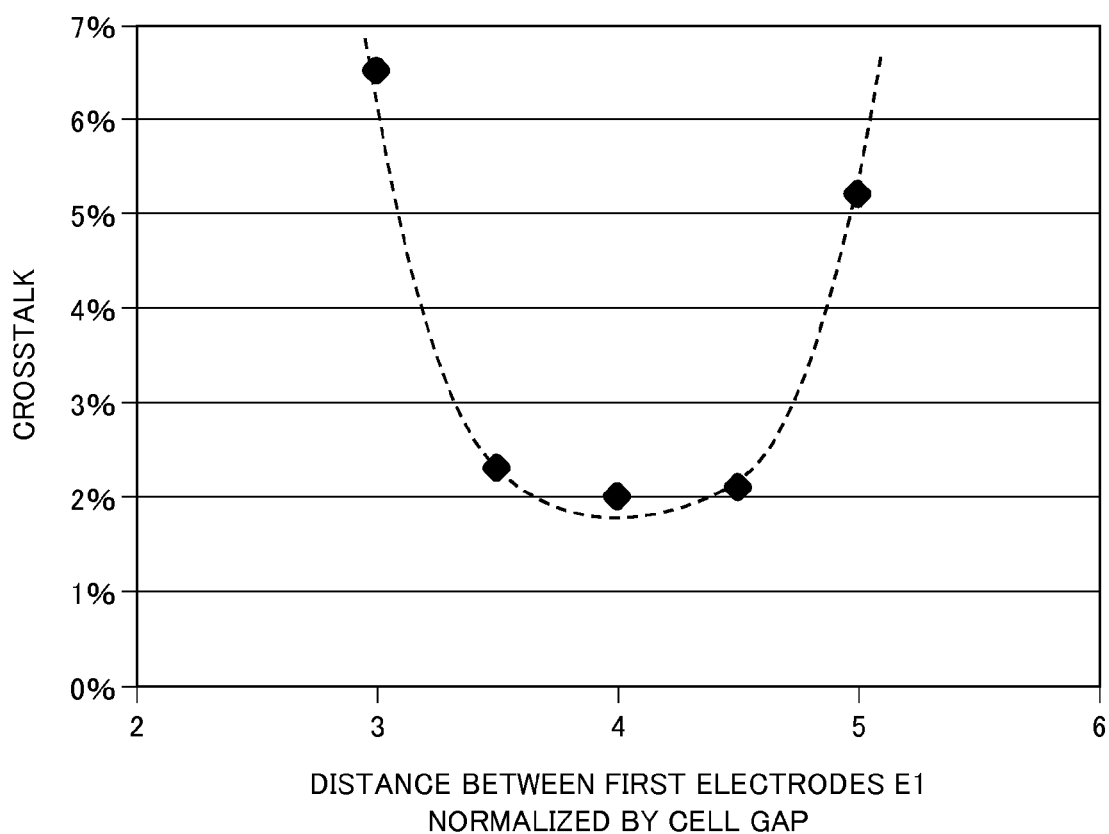

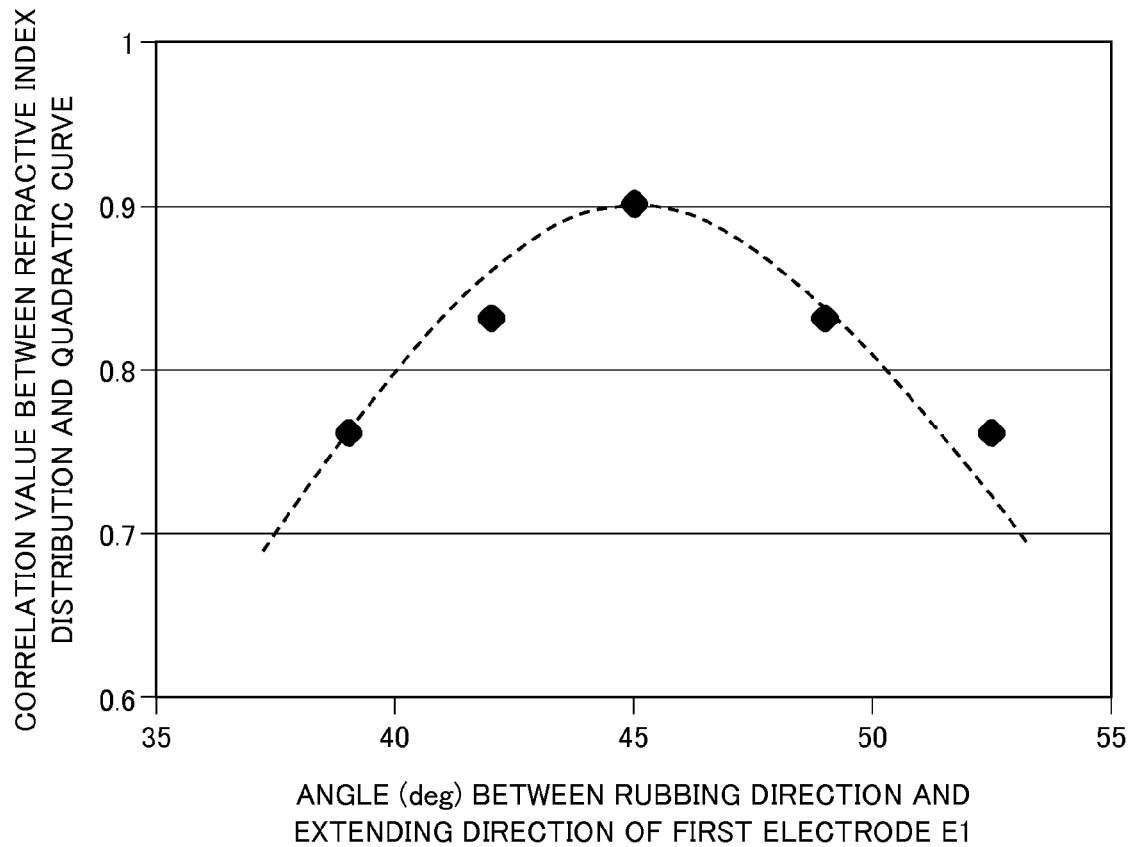

IMAGE DISPLAY DEVICE AND LIQUID CRYSTAL LENS

CROSS-REFERENCE TO RELATED APPLICATION

The present application claims priority from Japanese application JP2012-245848 filed on Nov. 7, 2012, the content of which is hereby incorporated by reference into this application.

BACKGROUND OF THE INVENTION

1. Field of the Invention

The present invention relates to an image display device and a liquid crystal lens.

2. Description of the Related Art

Liquid crystal has such characteristics that it has fluidity like liquid, exhibits anisotropy in electrical and optical properties, and can be variously controlled in a molecule alignment state. Liquid crystal lenses have been known in which the liquid crystal having such properties is sealed in a pair of substrates and a distribution characteristic of the refractive index is controlled by controlling a voltage to be applied to a liquid crystal layer.

As the liquid crystal lenses, a liquid crystal lens that is in homogeneous alignment in a state where a voltage is not applied to the liquid crystal layer and is brought into a state of providing a lens effect by applying a voltage has been known. An image display device having the liquid crystal lens on a front surface of a display panel provides a viewer at a predetermined position with a two-dimensional image or a three-dimensional image.

JP 2011-164273 A intends to provide a liquid crystal display device in which a steep change in light transmittance with respect to an applied voltage is improved. JP 2011-164273 A discloses a liquid crystal display device in which a twist direction of a liquid crystal material determined by the combination of a pretilt angle and alignment treatment directions of a set of alignment films is opposite to a twist direction of the liquid crystal material induced by a chiral agent.

SUMMARY OF THE INVENTION

FIGS. 7A and 7B each schematically show a cross section of a TN (Twisted Nematic) alignment liquid crystal lens LZ arranged on a front surface (display surface side) of a display panel PNL.

FIG. 7A shows a state where an electric field is not applied to a liquid crystal layer LC, in which liquid crystal molecules between two substrates are aligned in a 90-degree twist by not-shown alignment films. FIG. 7B shows a state where an electric field is applied between electrodes E on a first substrate B1 side and an electrode PE on a second substrate side, in which a lens effect is exhibited. In the TN alignment liquid crystal lens LZ shown in the drawings, the liquid crystal layer LC is interposed between the first substrate B1 and the second substrate B2, and a first polarizer PL1 and a second polarizer PL2 are arranged outside the two substrates. The first polarizer PL1 and the second polarizer PL2 are arranged in a crossed Nicol manner such that transmission axes are orthogonal to each other.

In the state of FIG. 7A, since the liquid crystal molecules are in TN alignment, an image from the display panel PNL transmits through the liquid crystal lens to be displayed as a two-dimensional image. In the state of FIG. 7B, a refractive index distribution is obtained while TN alignment is left between the two electrodes E, so that a three-dimensional image is displayed. Moreover, in the three-dimensional image display of FIG. 7B, TN alignment disappears at a portion overlapping the electrode E, which reduces the transmittance at the portion.

In a liquid crystal lens whose initial alignment is homogeneous alignment, display performance is adversely affected by a liquid crystal alignment defect occurring at the overlapping portion of the electrode E. However, by bringing the initial alignment of the liquid crystal layer LC into TN alignment, the transmittance in three-dimensional image display is reduced, so that an adverse effect due to an alignment defect is prevented.

However, in a liquid crystal lens whose liquid crystal molecules are brought into TN alignment by alignment films formed on interface surfaces of the first substrate B1 and the second substrate B2 on the liquid crystal layer LC side, alignment in the vicinity of the electrode E is disturbed when applying an electric field as shown in FIGS. 8A and 8B, resulting in an asymmetric refractive index distribution. When such an asymmetric refractive index distribution occurs, a right-eye image and a left-eye image are mixed in each of the eyes of the viewer, so that crosstalk worsens.

In view of the problem described above, it is an object of the invention to provide an image display device including a TN alignment liquid crystal lens with improved crosstalk, or to provide a TN alignment liquid crystal lens with improved crosstalk. The above and other objects and novel features of the invention will become apparent from the description of the specification and the accompanying drawings.

In view of the problem described above, an image display device according to the invention includes: a display panel including a plurality of pixels arranged in a matrix; and a liquid crystal lens arranged on a display surface side of the display panel, wherein the liquid crystal lens includes a first substrate and a second substrate, a liquid crystal layer interposed between the first substrate and the second substrate, and a first alignment film formed on an interface surface between the first substrate and the liquid crystal layer and a second alignment film formed on an interface surface between the second substrate and the liquid crystal layer, the first alignment film and the second alignment film are alignment films subjected to a rubbing treatment so that liquid crystal molecules in the liquid crystal layer are aligned in a 90° twist in a first direction by the provision of a pretilt angle, and the liquid crystal molecules in the liquid crystal layer are aligned, by the addition of a chiral agent to the liquid crystal layer, in a 90° twist in a second direction opposite to the first direction in a state where an electric field is not applied.

In one aspect of the image display device according to the invention, a plurality of electrodes extending in a predetermined direction may be formed on the first substrate, a refractive index distribution may be formed between the plurality of electrodes when an electric field is applied between the first substrate and the second substrate, and the condition of 3.5≤(p−w)/d≤4.5 may be established, where w is the electrode width of the plurality of electrodes, p is the electrode pitch of the plurality of electrodes, and d is the thickness of the liquid crystal layer.

In one aspect of the image display device according to the invention, a rubbing direction in the first alignment film may form an angle of from 40 degrees to 50 degrees with the predetermined direction, and a rubbing direction in the second alignment film may form an angle of from 40 degrees to 50 degrees with the predetermined direction in a direction opposite to the rubbing direction in the first alignment film.

In view of the problem described above, an image display device according to the invention includes: a display panel including a plurality of pixels arranged in a matrix; and a liquid crystal lens arranged on a display surface side of the display panel, wherein the liquid crystal lens includes a first substrate and a second substrate, a liquid crystal layer interposed between the first substrate and the second substrate, and a first alignment film formed on an interface surface between the first substrate and the liquid crystal layer and a second alignment film formed on an interface surface between the second substrate and the liquid crystal layer, the first alignment film and the second alignment film are alignment films subjected to a photo-alignment treatment, and liquid crystal molecules in the liquid crystal layer are aligned, by the addition of a chiral agent to the liquid crystal layer, in a 90° twist in a state where an electric field is not applied.

In view of the problem described above, a liquid crystal lens according to the invention includes: a first substrate and a second substrate; a liquid crystal layer interposed between the first substrate and the second substrate; and a first alignment film formed on an interface surface between the first substrate and the liquid crystal layer and a second alignment film formed on an interface surface between the second substrate and the liquid crystal layer, wherein the first alignment film and the second alignment film are alignment films subjected to a rubbing treatment so that liquid crystal molecules in the liquid crystal layer are aligned in a 90° twist in a first direction by the provision of a pretilt angle, and the liquid crystal molecules in the liquid crystal layer are aligned, by the addition of a chiral agent to the liquid crystal layer, in a 90° twist in a second direction opposite to the first direction in a state where an electric field is not applied.

According to the invention, it is possible to provide an image display device including a TN alignment liquid crystal lens with improved crosstalk, or to provide a TN alignment liquid crystal lens with improved crosstalk.

BRIEF DESCRIPTION OF THE DRAWINGS

FIG. 5B is a graph showing a relation between the distance between the first electrodes normalized by the cell gap and the amount of generated crosstalk.

FIG. 6 is a graph showing a relation between a rubbing direction of a first alignment film formed on a first substrate and the correlation value between the refractive index distribution appearing in the liquid crystal lens and the quadratic curve.

DETAILED DESCRIPTION OF THE INVENTION

Hereinafter, embodiments of the invention will be described with reference to the drawings.

First Embodiment

Figure 1:
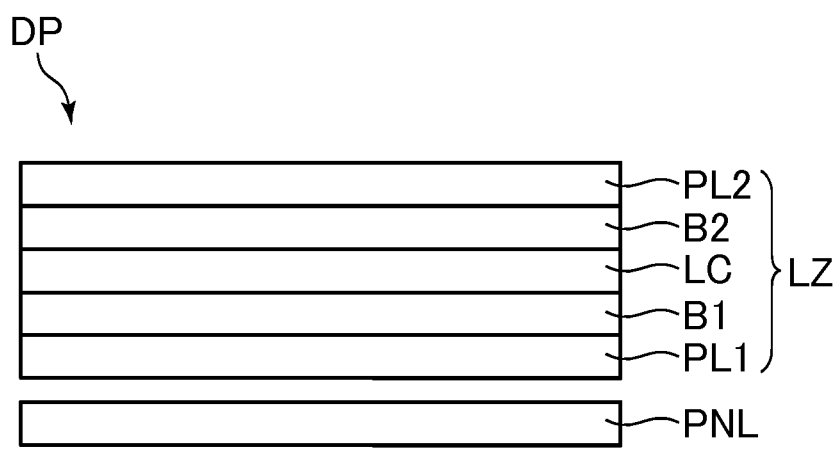
FIG. 1 is a schematic view of an image display device according to a first embodiment of the invention.

FIG. 1 is a schematic view of an image display device DP according to a first embodiment of the invention. The image display device DP is configured to include a display panel PNL and a liquid crystal lens LZ arranged on a viewer side (front surface or display surface side) of the display panel PNL. The image display device in the first embodiment has a function of switching display between a three-dimensional image and a two-dimensional image.

The liquid crystal lens LZ is configured to include a first substrate B1, a second substrate B2, a first polarizer PL1, a second polarizer PL2, and a liquid crystal layer LC. The first polarizer PL1 and the second polarizer PL2 are arranged such that transmission axes are orthogonal to each other.

The liquid crystal lens LZ forms a lens array including a plurality of lens portions when an electric field is applied to the liquid crystal layer LC. The liquid crystal lens of the embodiment provides a viewer with three-dimensional display when an electric field is applied to the liquid crystal layer LC, while providing the viewer with two-dimensional display in a state where no electric field is applied.

The display panel PNL is configured to include a plurality of pixels arranged in a matrix. The lens portions formed by the liquid crystal lens LZ correspond to pixel rows for outputting left-eye display and pixel rows for outputting right-eye display in the display panel PNL.

Figure 2:
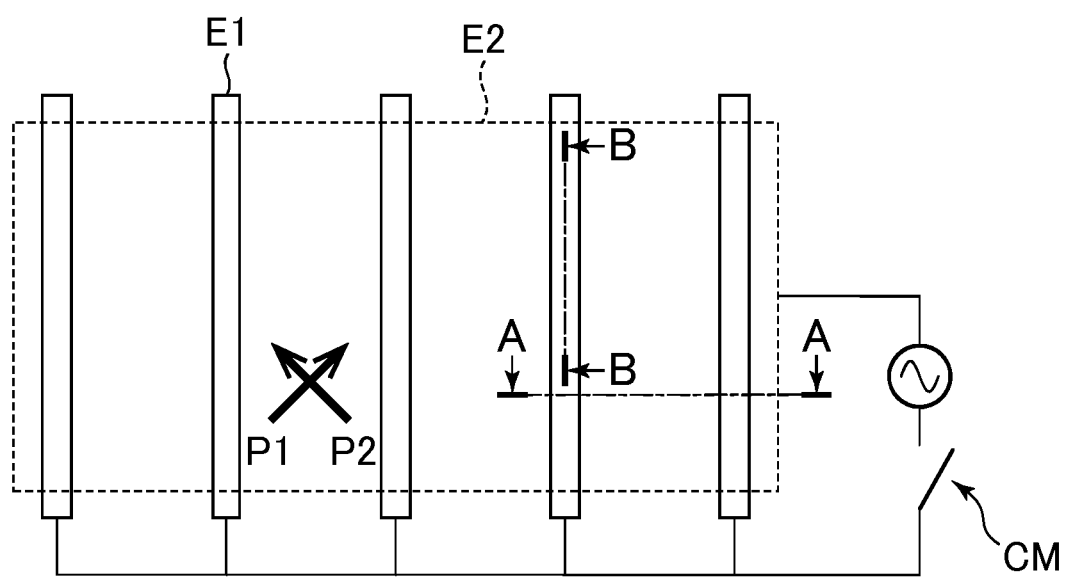
FIG. 2 is a schematic view of an electrode structure, in plan view, in a liquid crystal lens of the first embodiment.

FIG. 2 is a schematic view of an electrode structure, in plan view, in the liquid crystal lens LZ of the embodiment, corresponding to the case of viewing the image display device DP from the viewer side. On the first substrate B1, a plurality of electrodes (first electrodes E1) each extending in a vertical direction as viewed from the viewer and formed in a strip shape are arranged. On the second substrate B2, a second electrode E2 formed in a plate shape so as to correspond to a display area of the display panel PNL is arranged. Hence, in the liquid crystal lens LZ of the embodiment, a lens array including a plurality of cylindrical lens-shaped lens portions is formed by applying an electric field between the first electrodes E1 and the second electrode E2. In the embodiment, each of the lens portions in the lens array is formed so as to correspond to two pixel rows in the display panel PNL. The first electrodes E1 may be formed such that the electrodes extending in the vertical direction are coupled to each other at an upper or lower portion of the liquid crystal lens LZ to form a comb-teeth shape.

On an interface surface of the first substrate B1 on the liquid crystal layer LC side, a not-shown alignment film (first alignment film) is formed. On an interface surface of the second substrate B2 on the liquid crystal layer LC side, a not-shown alignment film (second alignment film) is formed. Arrows P1 and P2 in FIG. 2 indicate rubbing directions in the first alignment film and the second alignment film, respectively. The rubbing directions are set such that each of the directions forms an angle of 45 degrees with respect to an extending direction of the first electrode E1, and that the rubbing direction of the first alignment film and the rubbing direction of the second alignment film intersect each other at right angles. The liquid crystal molecules of the liquid crystal layer LC are provided with a pretilt angle by the alignment films subjected to a rubbing treatment. In an initial alignment state where a voltage is not applied, long axis directions of the liquid crystal molecules are aligned in the directions indicated by the arrows P1 and P2 in the vicinity of the first substrate B1 and in the vicinity of the second substrate B2.

Between the first electrodes E1 and the second electrode E2, a display switching means CM is connected through wiring. The display switching means CM is switched between an ON state and an OFF state by an external input. In the case of the ON state, a voltage is input between the first electrodes E1 and the second electrode E2 to control the alignment of the liquid crystal layer LC.

Figure 3A:
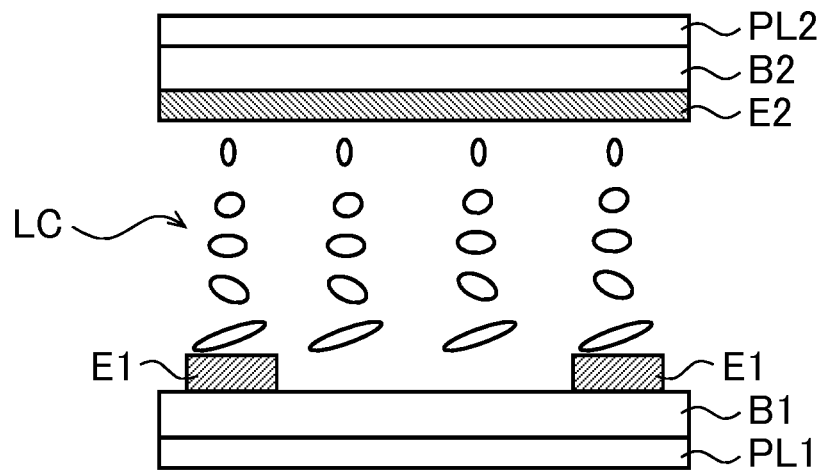
FIG. 3A shows a state of a cross section of the liquid crystal lens of the first embodiment.
Figure 3B:
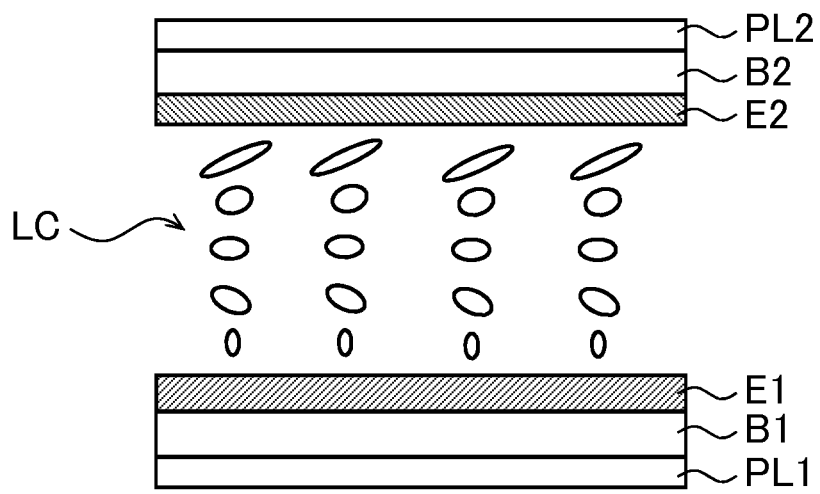
FIG. 3B shows a state of a cross section of the liquid crystal lens of the first embodiment.
Figure 3C:
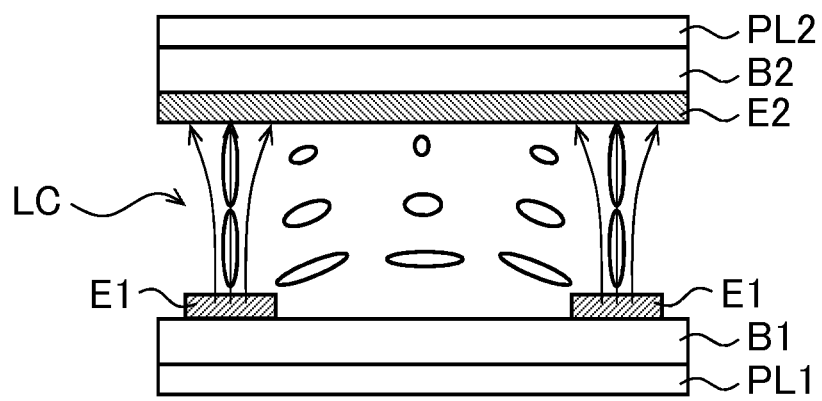
FIG. 3C shows a state of a cross section of the liquid crystal lens of the first embodiment.

FIGS. 3A to 3C each show a state of a cross section of the liquid crystal lens LZ of the embodiment. FIGS. 3A and 3B show a state where an electric field is not applied to the liquid crystal layer LC, in which FIG. 3A shows a cross section corresponding to a position of A-A in FIG. 2; and FIG. 3B shows a cross section corresponding to a position of B-B in FIG. 2. FIG. 3C shows a state where a lens function is provided by the application of an electric field to the liquid crystal layer LC, and is a cross section corresponding to the position of A-A in FIG. 2.

To the liquid crystal layer LC of the liquid crystal lens LZ of the embodiment, a chiral agent is added. The chiral agent induces a twist direction (second direction) that is opposite to a twist direction (first direction) of the liquid crystal molecules determined by the combination of the pretilt angle and the alignment treatment directions of the alignment films (not shown in FIGS. 3A to 3C) formed on the interface surfaces between the first and second substrates B1 and B2 and the liquid crystal layer LC. In the embodiment, by adding the chiral agent to the liquid crystal layer LC, the initial alignment state of the liquid crystal layer LC is brought into TN (Twisted Nematic) alignment in which liquid crystal molecules are twisted 90 degrees in the second direction.

In the state of the liquid crystal lens LZ in FIGS. 3A and 3B, since the liquid crystal molecules are in TN alignment between the two substrates, a light beam transmitted through the first polarizer PL1 is caused to rotate 90 degrees in a polarization state of the light beam and transmits through the second polarizer PL2. Hence, in the state where an electric field is not applied between the two substrates, a propagation direction of the light beam from the display panel PNL is not modulated approximately, so that an image from the display panel PNL is displayed.

On the other hand, in the state of the liquid crystal lens LZ in FIG. 3C, the alignment of the liquid crystal molecules is gradually changed between the two first electrodes E1, and the liquid crystal molecules tend to lie as the position moves toward the center. For this reason, a refractive index distribution occurs between the two first electrodes E1 and therefore a lens function is exhibited, so that the propagation direction of the light beam transmitted through the first polarizer PL1 is modulated. When an electric field is applied to the liquid crystal lens LZ, the display panel PNL is switched from two-dimensional image display to three-dimensional image display and performs control so as to display a left-eye image and a right-eye image at left-eye and right-eye pixels. Due to this, the image display device DP outputs a stereoscopic image by providing a left-eye image and a right-eye image respectively to left and right eyes of the viewer at a predetermined position.

In the image display device DP of the embodiment, since the chiral agent is added to the liquid crystal layer LC of the liquid crystal lens LZ, asymmetry in the refractive index distribution of each of the lens portions is prevented from appearing. As shown in FIG. 3A, even when the pretilt angle due to the first alignment film and the second alignment film exists, the liquid crystal molecules are aligned in a twisted manner in a direction opposite to a twist direction caused by the alignment films and the pretilt angle. Therefore, the disturbance of liquid crystal molecule arrangement, which occurs on the first substrate B1 side where the first electrodes E1 are formed, is suppressed, so that asymmetry in the refractive index distribution is prevented when an electric field is applied. Then, since the asymmetry in the refractive index distribution is suppressed, images respectively corresponding to the left and right eyes of the viewer are correctly provided easily, leading to an improvement in crosstalk.

Figure 4A:
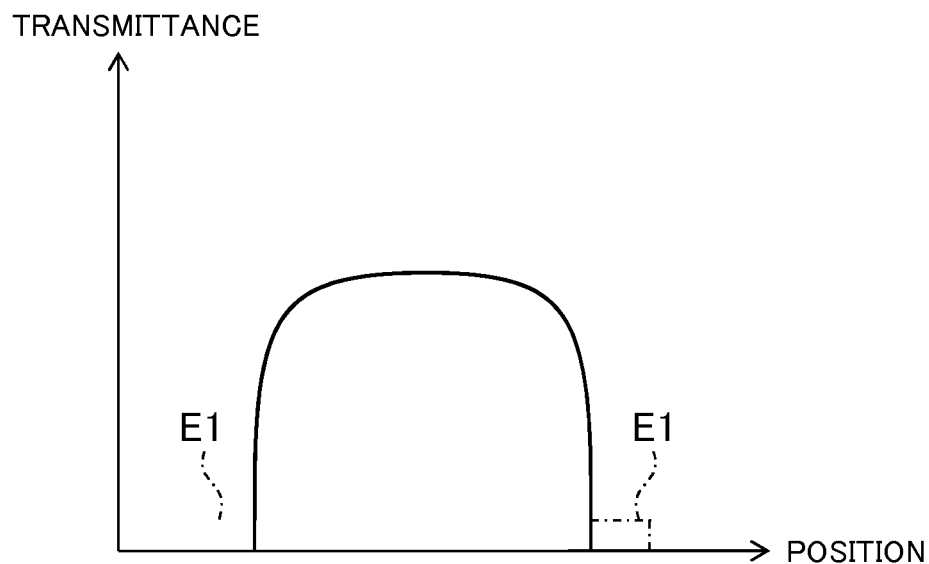
FIG. 4A is a graph schematically showing a transmittance distribution between two first electrodes when applying an electric field to a liquid crystal layer of the first embodiment.
Figure 4B:
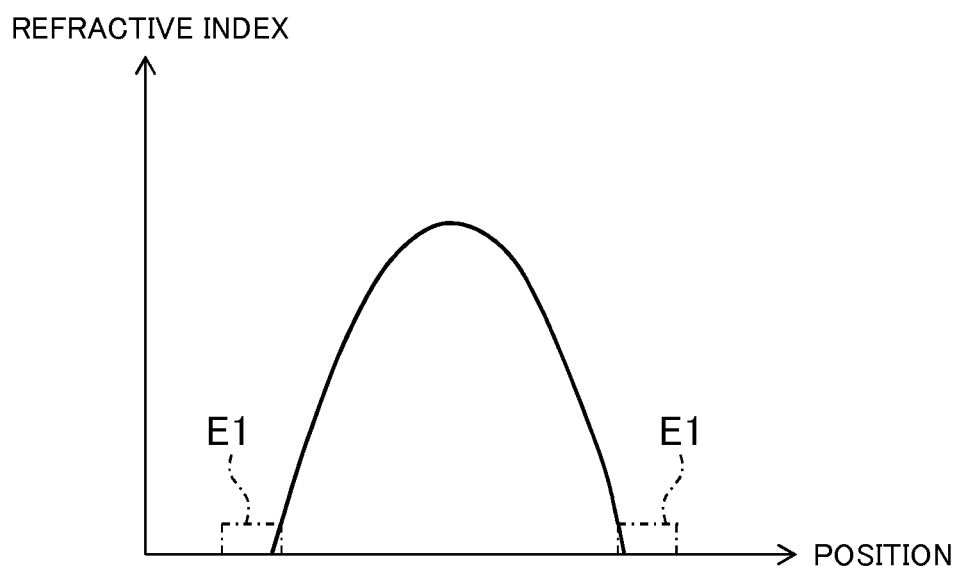
FIG. 4B is a graph schematically showing a refractive index distribution between the two first electrodes when applying an electric field to the liquid crystal layer of the first embodiment.

FIGS. 4A and 4B are graphs schematically showing a transmittance distribution and a refractive index distribution, respectively, between two first electrodes E1 when applying an electric field to the liquid crystal layer LC of the embodiment. The horizontal axes of FIGS. 4A and 4B each correspond to the position between the two first electrodes E1. The vertical axis of FIG. 4A represents the transmittance, while the vertical axis of FIG. 4B represents the refractive index.

Since the molecular long axes of liquid crystal molecules are aligned in the vertical direction on and above the first electrode E1 as shown in FIG. 3C, TN alignment of the liquid crystal molecules caused by the chiral agent is resolved. For this reason, as shown in FIG. 4A, the transmittance at the position of the first electrode E1 is reduced, while as an influence of an electric field is weakened with distance from the first electrode E1, the twist of liquid crystal molecules is induced by the chiral agent to thereby improve the transmittance. As shown in FIG. 4B, as for the refractive index distribution in an area between the first electrodes E1, the refractive index is improved and a change in the refractive index becomes gentle as the position moves from the first electrode E1 toward the center of the lens portion.

The chiral agent that induces a twist in a direction opposite to the twist direction of liquid crystal molecules LC induced by the alignment films formed on the first substrate B1 and the second substrate B2 is set such that a relation between a chiral pitch c and a cell gap d satisfies the condition of $0<d/c<1/2$ at a normal temperature (specifically in a range from 0 degree to 40 degrees). When the relation falls out of this range, it is highly probable that a twist of liquid crystal alignment in the first direction or a 270-degree twist of liquid crystal alignment in the second direction occurs, which is not desirable.

Next, a relation between the cell gap d representing the thickness of the liquid crystal layer LC of the embodiment and a distance between the first electrodes E1 will be described.

Figure 5A:
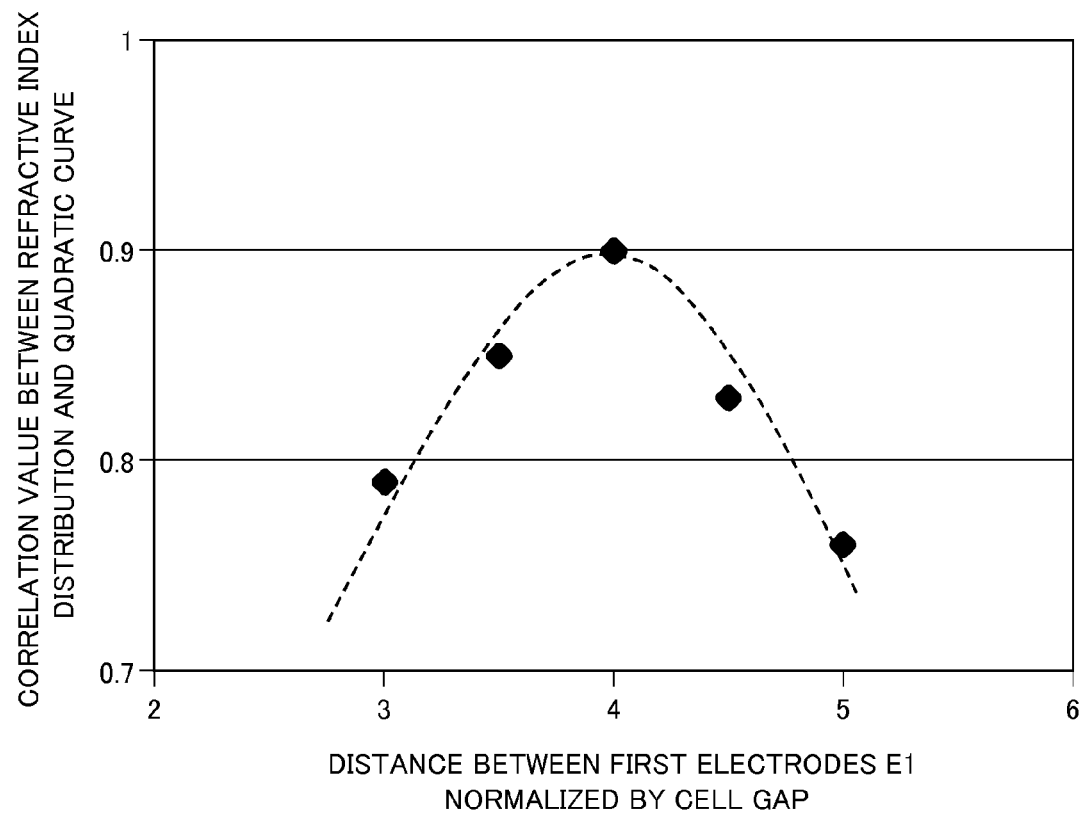
FIG. 5A is a graph showing a relation between a distance between first electrodes normalized by a cell gap and a correlation value between a refractive index distribution and a quadratic curve.
Figure 7A:
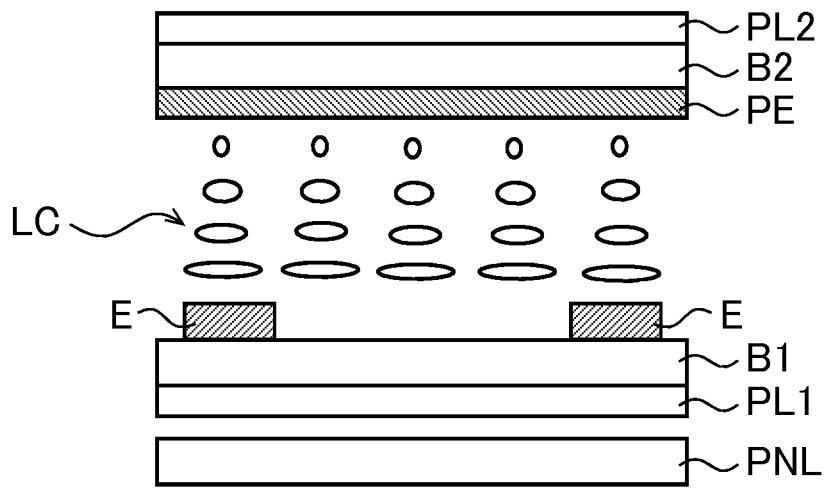
FIG. 7A schematically shows a cross section of a TN alignment liquid crystal lens.
Figure 7B:
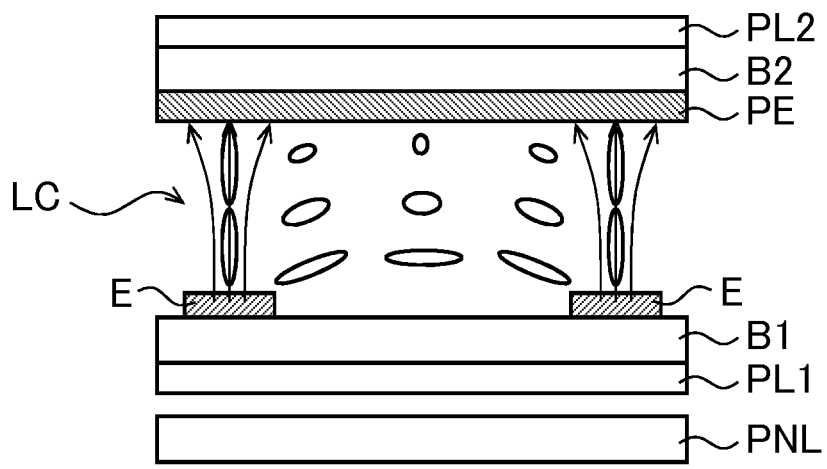
FIG. 7B schematically shows a cross section of the TN alignment liquid crystal lens.
Figure 8A:
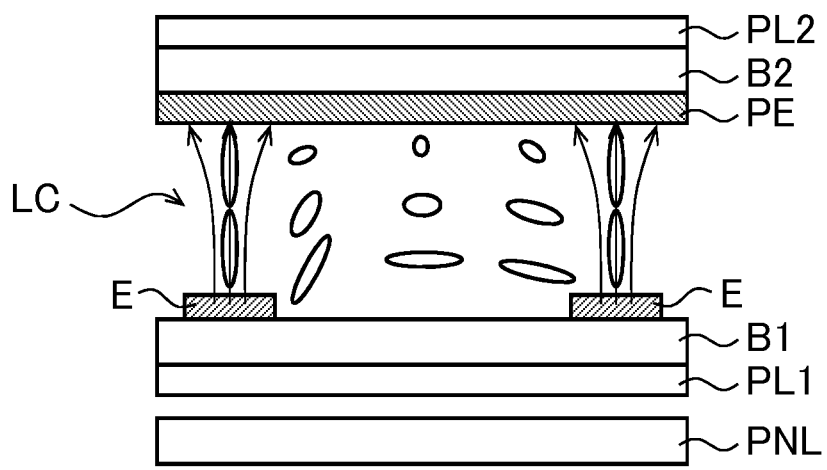
FIG. 8A shows a state of the TN alignment liquid crystal lens where alignment in the vicinity of an electrode is disturbed when applying an electric field to thereby cause asymmetric liquid crystal alignment.
Figure 8B:
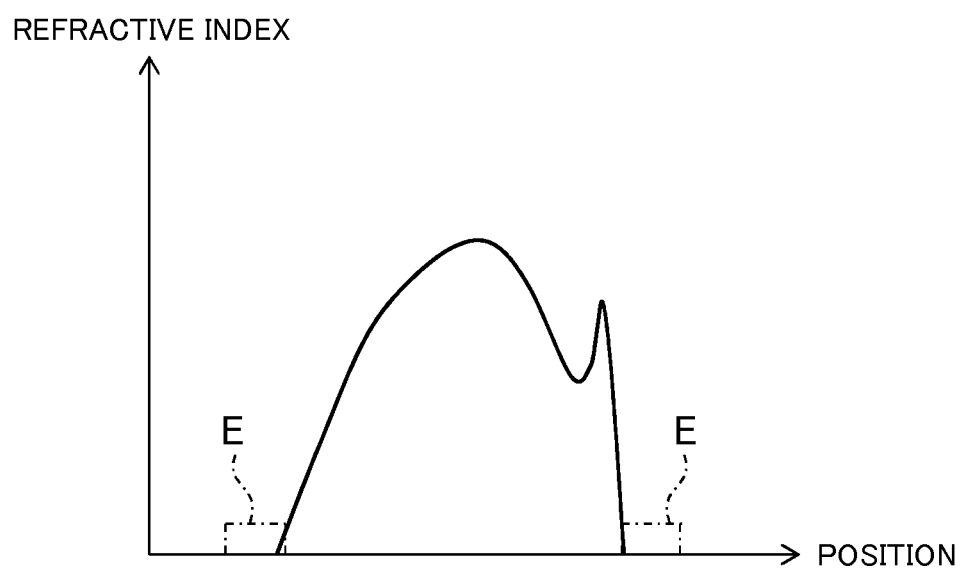
FIG. 8B shows a state of the TN alignment liquid crystal lens where alignment in the vicinity of the electrode is disturbed when applying an electric field to thereby cause an asymmetric refractive index distribution.

FIGS. 5A and 5B are graphs for explaining a relation between the distance between the first electrodes E1 normalized by the cell gap d and the amount of generated crosstalk. The vertical axis of the graph in FIG. 5A represents the correlation value between a refractive index distribution and a quadratic curve, where it is shown that when the distance between the first electrodes E1 is about four times the cell gap d, the refractive index distribution approaches the quadratic curve most. The vertical axis of the graph in FIG. 5B represents the amount of generated crosstalk, where when the correlation value between the refractive index distribution and the quadratic curve is improved, the amount of generated crosstalk is reduced.

In the embodiment, an electrode width w of the first electrode E1 is 10 µm, a pitch p between the first electrodes E1 is 160 µm, and the cell gap d is 25 µm. Compared to the case where the chiral agent is not added, crosstalk is reduced by about 2%.

The relation between the cell gap d of the liquid crystal layer LC and the distance between the first electrodes E1 (that is, p−w) is preferably set, as shown in FIG. 5B and the like, so as to satisfy the condition of 3.5≤(p−w)/d≤4.5. As shown in FIG. 5B, when (p−w)/d is set to 3 or less or 5 or more, crosstalk abruptly becomes large. Therefore, by setting the distance between the first electrodes E1 within the range described above, crosstalk can be reduced to 5% or less.

As the cell gap d of the liquid crystal layer LC, it is preferable to employ a value from 18 µm to 27 µm or from 20 µm to 25 µm. The electrode width w of the first electrode E1 is preferably from 8 µm to 20 µm or from 10 µm to 15 µm. The pitch p between the first electrodes E1 is preferably from 100 µm to 200 µm.

Next, a relation between a direction in which the first electrode E1 extends and an alignment treatment direction of an alignment film formed on the interface surface of the liquid crystal layer LC.

FIG. 6 is a graph showing a relation between the rubbing direction (initial alignment direction) of the first alignment film formed on the first substrate B1 and the correlation value between the refractive index distribution appearing in the liquid crystal lens LZ and the quadratic curve. The rubbing direction of the first alignment film represented by the horizontal axis in FIG. 6 is an angle with respect to the extending direction of the first electrode E1. In the graph of FIG. 6, the rubbing direction of the second alignment film formed on the second substrate B2 is −45 degrees. As shown in the drawing, when an angle between the first electrode E1 and the rubbing direction of the first alignment film is 45 degrees, the correlation value between the refractive index distribution and the quadratic curve is the highest.

When the correlation value between the refractive index distribution and the quadratic curve decreases, crosstalk in the liquid crystal lens LZ in three-dimensional display worsens. It is considered from FIG. 5 that when the correlation value is 0.8 or less, crosstalk is about 5% or more. Hence, it is desirable that the rubbing direction of the first alignment film is set so as to be from 40 degrees to 50 degrees with respect to the extending direction of the first electrode E1, and that the rubbing direction of the second alignment film is set so as to be from 40 degrees to 50 degrees with respect to the extending direction of the first electrode E1 in a reverse direction of the rubbing direction of the first alignment film.

Second Embodiment

In the first embodiment, the first alignment film and the second alignment film are formed on the interface surfaces of the liquid crystal layer LC; the rubbing directions are set so as to intersect each other at right angles as shown in FIG. 2; and the chiral agent is provided so as to cause a twist in a direction opposite to a twist direction determined by the initial alignment directions caused by the two alignment films and the pretilt angle. On the other hand, a second embodiment differs from the first embodiment in that the first alignment film and the second alignment film on the interface surfaces of the liquid crystal layer LC are each a photo-alignment film, and that a chiral agent is added such that the relation between the chiral pitch c and the cell gap d satisfies the condition of $0<d/c<1/2$.

When the chiral agent is not added to the liquid crystal layer LC of the image display device DP of the second embodiment, liquid crystal alignment in which the molecular long axis rotates clockwise as the position moves from the first substrate B1 toward the second substrate B2 side and liquid crystal alignment in which the molecular long axis rotates anticlockwise are mixed. This causes a domain to thereby worsen crosstalk in the liquid crystal lens.

However, by adding to the liquid crystal layer LC a chiral agent that induces a twist of the molecular long axis to rotate clockwise or anticlockwise as the position moves from the first substrate B1 toward the second substrate B2 side, the generation of crosstalk can be reduced.

The electrode patterns of the first electrode E1 and the second electrode E2 in the embodiments may be replaced with each other. Moreover, although the second electrode E2 has a plate-like electrode shape in the embodiments, the second electrode E2 may have any shape as long as a lens function can be exhibited between two first electrodes E1.

As the display panel PNL in the embodiments, a liquid crystal display panel may be used, or an organic EL display panel may be used. When a liquid crystal display panel is used, a backlight is further arranged on a rear surface of the display panel PNL. In the liquid crystal lens LZ of the first embodiment, the rubbing directions of the first alignment film and the second alignment film are set so as to intersect each other at 90 degrees, and further, a chiral agent is added so as to cause TN alignment in which a 90-degree twist is induced in the second direction. However, these are not limited to the case of a perfect 90 degrees, and errors in manufacture or the like are allowable.

The invention is not limited to the embodiments described above, and various modifications are possible. For example, the configurations described in the embodiments can be replaced with substantially the same configuration, a configuration providing the same operational effect, or a configuration capable of achieving the same objects.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An image display device comprising:
a display panel including a plurality of pixels arranged in a matrix; and
a liquid crystal lens arranged on a display surface side of the display panel,
wherein
the liquid crystal lens includes:
a first substrate and a second substrate,
a plurality of first electrodes on the first substrate, leaving a space next to each other and electrically connected with each other,
a second electrode on the second substrate, overlapping with the plurality of first electrodes,
a liquid crystal layer interposed between the first substrate and the second substrate, and a first alignment film formed on an interface surface between the first substrate and the liquid crystal layer and a second alignment film formed on an interface surface between the second substrate and the liquid crystal layer, the first alignment film and the second alignment film are alignment films subjected to a rubbing treatment so that liquid crystal molecules in the liquid crystal layer are aligned in a 90° twist in a first direction in addition to the provision of a pretilt angle which promotes the liquid crystal molecules to rise in a direction of the pretilt angle in a state where an electric field is applied between the plurality of first electrodes and the second electrode, the liquid crystal molecules in the liquid crystal layer are aligned, by the addition of a chiral agent to the liquid crystal layer, in a 90° twist in a second direction opposite to the first direction in a state where the electric field is not applied, and the chiral agent impedes easiness of the rising of the liquid crystal molecules in the direction of the pretilt angle in a state where the electric field is applied between the plurality of first electrodes and the second electrode, whereby the liquid crystal molecules orderly rise in spite of the pretilt angle.

2. The image display device according to claim 1, wherein the plurality of first electrodes extend in a predetermined direction, a refractive index distribution is formed between the plurality of first electrodes when the electric field is applied between the first substrate and the second substrate, and the condition of $3.5 \leq (p-w)/d \leq 4.5$ is established, where w is the electrode width of the plurality of first electrodes, p is the electrode pitch of the plurality of first electrodes, and d is the thickness of the liquid crystal layer.

3. The image display device according to claim 2, wherein a rubbing direction in the first alignment film forms an angle of from 40 degrees to 50 degrees with the predetermined direction, and a rubbing direction in the second alignment film forms an angle of from 40 degrees to 50 degrees with the predetermined direction in a direction opposite to the rubbing direction in the first alignment film.

4. A liquid crystal lens comprising:

a first substrate and a second substrate;

a plurality of first electrodes on the first substrate, leaving a space next to each other and electrically connected with each other;

a second electrode on the second substrate, overlapping with the plurality of first electrodes;

a liquid crystal layer interposed between the first substrate and the second substrate; and a first alignment film formed on an interface surface between the first substrate and the liquid crystal layer and a second alignment film formed on an interface surface between the second substrate and the liquid crystal layer, wherein the first alignment film and the second alignment film are alignment films subjected to a rubbing treatment so that liquid crystal molecules in the liquid crystal layer are aligned in a 90° twist in a first direction in addition to the provision of a pretilt angle which promotes the liquid crystal molecules to rise in a direction of the pretilt angle in a state where an electric field is applied between the plurality of first electrodes and the second electrode, the liquid crystal molecules in the liquid crystal layer are aligned, by the addition of a chiral agent to the liquid crystal layer, in a 90° twist in a second direction opposite to the first direction in a state where an electric field is not applied, and the chiral agent impedes easiness of the rising of the liquid crystal molecules in the direction of the pretilt angle in a state where the electric field is applied between the plurality of first electrodes and the second electrode, whereby the liquid crystal molecules orderly rise in spite of the pretilt angle.

* * * * *